United States Patent [19]

Hsieh

[11] 4,403,257
[45] Sep. 6, 1983

[54] HALFTONE DETECTION AND DELINEATION

[75] Inventor: Robert C. Hsieh, Rancho Palos Verdes, Calif.

[73] Assignee: Xerox Corporation, Stamford, Conn.

[21] Appl. No.: 359,965

[22] Filed: Mar. 19, 1982

[51] Int. Cl.³ .............................................. H04N 1/40
[52] U.S. Cl. .................................... 358/283; 358/280
[58] Field of Search ................. 358/280, 282, 283, 284

[56] References Cited

U.S. PATENT DOCUMENTS 4,194,221 3/1980 Stoffel ................................ 358/283

OTHER PUBLICATIONS

Tomory—Halftone Detection Using Transition Counting Xerox Disclosure Journal—vol. 5, #6, Nov./Dec. 1980, p. 643.

Primary Examiner—Joseph A. Orsino, Jr.
Attorney, Agent, or Firm—Robert E. Cunha

[57] ABSTRACT

In a reprographic system, a method for distinguishing halftone areas from text in an original. The system raster input scanner produces lines of binary data. A predetermined set of bits within a moveable window is inspected and the probability of that particular set of bits being taken from a halftone area of the original is assigned. The window is moved, bit by bit, and line by line, while an accumulation of probability scores is accomplished. Then, the determination, halftone or text, is made for each 32 by 32 bit block, based on a comparison of the accumulation to a predetermined threshold number. Finally, the block decisions themselves are inspected for halftone areas that may have been classified as text because of very high or low density. If surrounding blocks were determined to be halftone, the internal block will be corrected to halftone also.

9 Claims, 13 Drawing Figures

| | 630 | 660 | 690 | 720 | 750 | 780 | 810 | 840 | 870 | 900 | 930 | 960 | 990 | 1020 | 1050 | 1080 | 1110 | 1140 | 1170 | 1199 |
|---|---|---|---|---|---|---|---|---|---|---|---|---|---|---|---|---|---|---|---|---|
| 0 | 3 | 3 | 3 | 0 | 0 | 0 | 0 | 0 | 0 | 0 | 0 | 0 | 0 | 0 | 0 | 0 | 0 | 0 | 0 | 0 |
| 1 | 6 | 7 | 0 | 8 | 0 | 0 | 0 | 0 | 0 | 0 | 0 | 0 | 0 | 0 | 0 | 0 | 0 | 0 | 0 | 0 |
| 2 | 0 | 0 | 5 | 3 | 0 | 3 | 0 | 0 | 0 | 0 | 0 | 0 | 0 | 0 | 0 | 0 | 0 | 0 | 0 | 0 |
| 3 | 6 | 4 | 9 | 6 | 4 | 0 | 0 | 0 | 0 | 0 | 0 | 0 | 0 | 0 | 0 | 0 | 0 | 0 | 0 | 0 |
| 4 | 0 | 0 | 0 | 0 | 0 | 1 | 0 | 0 | 0 | 0 | 0 | 0 | 0 | 0 | 0 | 0 | 0 | 0 | 0 | 0 |
| 5 | 0 | 5 | 7 | 6 | 0 | 0 | 0 | 0 | 0 | 0 | 0 | 0 | 0 | 0 | 0 | 0 | 0 | 0 | 0 | 0 |
| 6 | 0 | 0 | 0 | 0 | 2 | 0 | 0 | 0 | 0 | 0 | 0 | 0 | 0 | 0 | 0 | 0 | 0 | 0 | 0 | 0 |
| 7 | 8 | 0 | 3 | 4 | 9 | 0 | 0 | 0 | 0 | 0 | 0 | 0 | 0 | 0 | 0 | 0 | 0 | 0 | 0 | 0 |
| 8 | 0 | 0 | 0 | 0 | 0 | 7 | 0 | 0 | 0 | 0 | 0 | 0 | 0 | 0 | 0 | 0 | 0 | 0 | 0 | 0 |
| 9 | 0 | 5 | 0 | 9 | 6 | 7 | 0 | 0 | 0 | 0 | 0 | 0 | 0 | 0 | 0 | 0 | 0 | 0 | 0 | 0 |
| 10 | 0 | 0 | 0 | 0 | 0 | 2 | 0 | 0 | 0 | 0 | 0 | 0 | 0 | 0 | 0 | 0 | 0 | 0 | 0 | 0 |
| 11 | 9 | 2 | 8 | 3 | 7 | 0 | 0 | 0 | 0 | 0 | 0 | 0 | 0 | 0 | 0 | 0 | 0 | 0 | 0 | 0 |
| 12 | 0 | 3 | 0 | 0 | 0 | 0 | 0 | 0 | 0 | 0 | 0 | 0 | 0 | 0 | 0 | 0 | 0 | 0 | 0 | 0 |
| 13 | 0 | 6 | 4 | 8 | 0 | 0 | 0 | 0 | 0 | 0 | 0 | 0 | 0 | 0 | 0 | 0 | 0 | 0 | 0 | 0 |
| 14 | 4 | 0 | 0 | 0 | 0 | 0 | 0 | 0 | 0 | 0 | 0 | 0 | 0 | 0 | 0 | 0 | 0 | 0 | 0 | 0 |
| 15 | 9 | 0 | 9 | 3 | 9 | 0 | 0 | 0 | 0 | 0 | 0 | 0 | 0 | 0 | 0 | 0 | 0 | 0 | 0 | 0 |
| 16 | 0 | 5 | 0 | 0 | 0 | 2 | 0 | 0 | 0 | 0 | 0 | 0 | 0 | 0 | 0 | 0 | 0 | 0 | 0 | 0 |
| 17 | 0 | 10 | 0 | 4 | 3 | 2 | 0 | 0 | 0 | 0 | 0 | 0 | 0 | 0 | 0 | 0 | 0 | 0 | 0 | 0 |
| 18 | 0 | 0 | 0 | 0 | 0 | 5 | 0 | 0 | 0 | 0 | 0 | 0 | 0 | 0 | 0 | 0 | 0 | 0 | 0 | 0 |
| 19 | 5 | 7 | 7 | 0 | 0 | 2 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |
| 21 | 0 | 3 | 0 | 7 | 0 | 0 | 0 | 0 | 0 | 0 | 0 | 0 | 0 | 0 | 0 | 0 | 0 | 0 | 0 | 0 |
| 22 | 0 | 0 | 3 | 0 | 3 | 0 | 0 | 0 | 0 | 0 | 0 | 0 | 0 | 0 | 0 | 0 | 0 | 0 | 0 | 0 |
| 23 | 7 | 0 | 9 | 2 | 0 | 0 | 0 | 0 | 0 | 0 | 0 | 0 | 0 | 0 | 0 | 0 | 0 | 0 | 0 | 0 |
| 24 | 0 | 4 | 0 | 0 | 0 | 7 | 0 | 0 | 0 | 0 | 0 | 0 | 0 | 0 | 0 | 0 | 0 | 0 | 0 | 0 |
| 25 | 3 | 7 | 0 | 7 | 0 | 0 | 0 | 0 | 0 | 0 | 0 | 0 | 0 | 0 | 0 | 0 | 0 | 0 | 0 | 0 |
| 26 | 3 | 0 | 0 | 0 | 0 | 6 | 0 | 0 | 0 | 0 | 0 | 0 | 0 | 0 | 0 | 0 | 0 | 0 | 0 | 0 |
| 27 | 4 | 6 | 5 | 0 | 0 | 0 | 0 | 0 | 0 | 0 | 0 | 0 | 0 | 0 | 0 | 0 | 0 | 0 | 0 | 0 |
| 28 | 0 | 0 | 0 | 0 | 0 | 7 | 0 | 0 | 0 | 0 | 0 | 0 | 0 | 0 | 0 | 0 | 0 | 0 | 0 | 0 |
| 29 | 4 | 3 | 0 | 7 | 0 | 5 | 0 | 0 | 0 | 0 | 0 | 0 | 0 | 0 | 0 | 0 | 0 | 0 | 0 | 0 |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| 1650 | 0 | 0 | 3 | 4 | 0 | 0 | 0 | 2 | 0 | 0 | 0 | 2 | 0 | 0 | 0 | 7 | 0 | 0 | 0 | 6 | 0 | 3 | 0 | 5 | 0 | 0 | 0 | 5 | 0 | 3 |
| 1680 | 0 | 6 | 3 | 6 | 0 | 4 | 4 | 5 | 0 | 7 | 0 | 5 | 0 | 4 | 0 | 3 | 3 | 6 | 0 | 3 | 3 | 9 | 0 | 8 | 0 | 5 | 0 | 5 | 2 | 9 |
| 1710 | 0 | 9 | 0 | 3 | 3 | 5 | 4 | 6 | 3 | 6 | 0 | 3 | 0 | 0 | 0 | 5 | 0 | 3 | 0 | 7 | 0 | 3 | 0 | 5 | 0 | 2 | 3 | 8 | 0 | 0 |
| 1740 | 0 | 3 | 0 | 4 | 3 | 9 | 4 | 8 | 0 | 6 | 0 | 7 | 0 | 10 | 0 | 7 | 0 | 8 | 0 | 7 | 0 | 6 | 0 | 6 | 0 | 3 | 0 | 3 | 4 | 6 |
| 1770 | 5 | 7 | 3 | 5 | 3 | 4 | 0 | 6 | 2 | 5 | 0 | 7 | 2 | 2 | 0 | 7 | 0 | 4 | 0 | 5 | 0 | 2 | 0 | 0 | 0 | 0 | 0 | 0 | 0 | 0 |
| 1800 | 0 | 0 | 0 | 0 | 0 | 0 | 0 | 0 | 0 | 0 | 3 | 0 | 0 | 0 | 4 | 3 | 5 | 0 | 0 | 0 | 0 | 0 | 0 | 0 | 0 | 0 | 2 | 0 | 5 | 0 |
| 1830 | 8 | 0 | 7 | 4 | 6 | 0 | 8 | 5 | 9 | 5 | 0 | 0 | 0 | 0 | 3 | 5 | 0 | 5 | 0 | 0 | 2 | 0 | 4 | 0 | 8 | 0 | 0 | 3 | 0 | 0 |
| 1860 | 0 | 0 | 0 | 0 | 0 | 5 | 0 | 0 | 0 | 3 | 0 | 0 | 0 | 2 | 5 | 4 | 0 | 0 | 4 | 5 | 0 | 4 | 0 | 5 | 0 | 0 | 3 | 6 | 0 | 3 |
| 1890 | 0 | 3 | 2 | 0 | 0 | 0 | 4 | 8 | 6 | 5 | 4 | 7 | 7 | 7 | 0 | 0 | 0 | 0 | 0 | 5 | 3 | 2 | 7 | 0 | 3 | 0 | 0 | 2 | 6 | 1 |
| 1920 | 0 | 0 | 0 | 0 | 0 | 0 | 0 | 0 | 0 | 0 | 0 | 0 | 0 | 0 | 0 | 0 | 9 | 0 | 3 | 5 | 0 | 2 | 0 | 8 | 0 | 0 | 0 | 2 | 0 | 0 |
| 1950 | 0 | 0 | 0 | 0 | 0 | 0 | 0 | 0 | 7 | 4 | 4 | 5 | 3 | 3 | 4 | 6 | 0 | 9 | 0 | 0 | 0 | 2 | 4 | 4 | 5 | 5 | 0 | 0 | 0 | 0 |
| 1980 | 0 | 0 | 6 | 1 | 0 | 0 | 0 | 0 | 0 | 0 | 0 | 0 | 0 | 5 | 0 | 4 | 4 | 0 | 0 | 3 | 0 | 7 | 0 | 8 | 0 | 5 | 5 | 6 | 0 | 6 |
| 2010 | 4 | 5 | 0 | 0 | 0 | 3 | 0 | 0 | | | | | | 3 | 2 | 8 | | 8 | 0 | 3 | 0 | 3 | | 0 | | | | 3 | 0 | 2 |
| 2040 | 0 | 5 | 0 | 0 | 0 | 2 | 1 | 0 | | | | | | | | | | | | | | | | | | | | | | |

```
HTDTTI - HTDTTI - HTDTTI - HTDTTI - HTDTTI
 1.       HTDTTI
 2.  C
 3.  C    R. HSIEH                    JAN. 31, 1979
 4.  C
 5.  C    HALFTONE DETECTION TEST PROGRAM 1
 6.  C    USE THE TABLE GENERATED BY CLASIF TO CALULATE THE SCORE FOR
 7.  C    EACH BLOCK OF A PARTICULAR DOCUMENT.
 8.  C
 9.  C    INPUTS
10.  C    DACIVDOC2 -- FOLE NAME WHICH CONTAINS THE CLASSIFICATION TABLE
11.  C                 TBLA (2**NBIT
12.  C    DOCT -- TEST DOCUMENT
13.  C    XB, YB, XE, YE -- BEGINING AND ENDING POINTS WHICH SPECIFY THE
14.  C                     RECTANGULAR PORTION OF THE DOCUMENT
15.  C
16.  C    OUTPUTS
17.  C    SCOREA -- ARRAY CONTAINS THE SCORE FOR EACH BLOCK WITH TBLA.
18.  C    SCOREB -- ARRAY CONTAINS THE SCORE FOR EACH BLOCK WITH TBLB.
19.  C    SCAVGA, SCAVGB -- AVERAGE SCORE WITH TBLA AND TBLB.
20.  C    SCDEVA, SCDEVB -- STANDARD DEVIATION OF SCORE WITH TBLA AND TBLB.
21.  C
22.       IMPLICIT INTEGER (A - W)
23.       GLOBAL RESOLUTION, INTEGER, LENGTHX, LENGTHY, KEYS, KEY1,
24.      2INNAME (3), OUTNAME (3), DOCN
25.       DIMENSION INPUT (80), IX (720)
26.       CALL SETBR (220S)
27.       OUTPUT (102) 'HTDTTI HERE, VERSION = A01'
28.       OUTPUT (102) 'DATA CONTROL FILE '
29.       READ (101, 10) INPUT
30.
```

```
HTDTTI - HTDTTI - HTDTTI - HTDTTI - HTDTTI
31.        10   FORMAT (80R1)
32.             INP = 1
33.             IF ( INPUT (1) .EQ . 1RM .AND . INPUT (2) .EQ .1RE ) INP = 102
34.             IF ( INP .NE. 102) CALL OPENX ( INP, 1, INPUT )
35.             CALL SOPN (( OUT = 2 ), INP )
36.             CALL SOPN (( IN = 1 ), INP )
37.        C    ASSIGN BIT MASK RELATED VARIABLES
38.             NBIT = 11
39.             TBSZ = 2**NBIT
40.             BTLG = 9
41.             BTWD = 3
42.             BNF = BTLG/2
43.             DB = BNF + 1
44.             BNE = BLTG - DB
45.             DIMENSION TBLA ( 0 : 2047), TBLB ( 0 : 2047 )
46.             CALL FREQ ( 16384 )
47.             CALL FREAD ( 44S, ERCD, 0, TBLA, ( LENGTH = TBSZ*4 ), INNAME )
48.             CALL FREAD ( 44S, ERCD, 1000, TBLB, ( LENGTH = TBSZ*4 ), INNAME )
49.             CALL FCLOSE ( 501$S, ERCD, INNAME )
50.             CALL SOPN (( IN = 1 ), INP )
51.             CALL EOFSET ( 200S )
52.        C    DUMMY READ IN ORDER TO OBTAIN RECORD LENGTH FOR
53.        C    DEFAULT VALUE
54.             CALL FREAD ( 43S, ERCD, KEYS, IX, ( LENGTH = 720 ), INNAME )
55.        53   OUTPUT (102) 'XB, YB, XE, YE IN INCHES '
56.             READ ( INP, 11 ) XB, YB, XE, YE
57.        11   FORMAT (1 OF .0)
58.             OUTPUT (102) 'BLOCK DIMENSION X, Y IN PIXELS '
59.             READ ( INP, 11 ) BKWD, BKLG
60.        C    ASSIGN DEFAULT VALUES TO BOUNDARY RELATED VARIABLES
```

```
HTDTT1 = HTDTT1 - HTDTT1 - HTDTT1 - HTDTT1
     61.     RECBG = 0
     62.     RECED = LENGTHY - 1
     63.     WDXB = 1
     64.     WDXE LENGTH/4
     65.     BFSZ = 5280 + BTLG
     66.     IF (XB .EQ. 99.) GO TO 20
     67.     RECBG = YB*RESOLUTION
     68.     RECED = YE*RESOLUTION
     69.     WDXB= XB*RESOLUTION/32
     70.     WDXE= XE*RESOLUTION/32
     71.     BFSZ = (WDXE - WDXB + 1) * 32 + BTLG
     72.  20 NBKX = BFSZ/BKWD; NBKY = (RECED - RECBG)/BKLG
     73.     DIMENSION SCOREA (51, 31), SCOREB (51, 31), IY (3, 2000)
     74.     DO 30 I = 1, NBKY + 1
     75.     DO 30 J = 1, NBKX + 1
     76.  30 SCOREA (I, J) = 0
     77.     DO 31 I = 1, NBKY + 1
     78.     DO 31 J = 1, NBKX + 1
     79.  31 SCOREB (I, J) = 0
     80.     DO 40 I = 1, 3
     81.     DO 40 J = 1, BFSZ
     82.  40 IY (I, J) = 0
     83.     KEY = RECBG*KEYI + KEYS
     84.     TBSZ4 = TBSZ * 4
     85.     CALL FREAD (45S, ERCD, KEY, IX, (LENGTH = 720), INNAME)
     86.  55 DO 50 L = WDXB, WDXE
     87.     IF (IX(L) .EQ. 0.) GO TO 50
     88.     DO 50 J = 1, 32
     89.     K = 32* (L - WDXB) + J + BNF
     90.     IF (IX(L) .IT. 0) IY (2, K) = 1
```

FIG. 6C

```
       HTDTTI - HTDTTI - HTDTTI - HTDTTI - HTDTTI
 91.        IX(L) = ISL(IX(L),1)
 92.   50   CONTINUE
 93.        PTR = 0
 94.        BY = 1
 95.        CY = 1
 96.        REPEAT 60, FOR RECIN = (RECBG + 1, RECED, 1)
 97.        IF (CY.GT.BKLG) BY = BY + 1; CY = 1
 98.        NM1PTR = MOD (PTR,3) + 1
 99.        NPTR = MOD (PTR + 1, 3) + 1
100.        NP1PTR = MOD (PTR + 2, 3) + 1
101.        DO 71 I = 1, BFSZ
102.   71   IY (NP1PTR, I) = 0
103.        KEY = RECIN*KEY1 + KEYS
104.        CALL FREAD (46S, ERCD, KEY, IX, (LENGTH = 720), INNAME)
105.        DO 70 L = WDXB, WDXE
106.        IF (IX(L).EQ.0) GO TO 70
107.        DO 70 J = 1, 32
108.        K = 32 * (L - WDXB) + J + BNF
109.        IF (IX(L).LT.0) IY(NP1PTR, K) = 1
110.        IX(L) = ISL(IX(L), 1)
111.   70   CONTINUE
112.        CX = 1
113.        BX = 1
114.        DO 80 M = 1, BFSZ - BTLG
115.        IF (CX.GT.BKWD) BX = BX + 1; CX = 1
116.        MP3 = M + 3
117.        MP5 = M + 5
118.        IP = 1024* IY (NM1PTR, M + 1) + 512* IY (NM1PTR, MP3) + 256 *IY (NM1PTR, MP5)
119.        2 + 128*IY (NM1PTR, M + 7) + 64* IY (NPTR, M) + 32*IY (NPTR, M + 2)
120.        3 + 16*IY (NPTR, M + 4) + 8*IY (NPTR, M + 6) + 4*IY (NPTR, M + 8)
```

```
121.      HTDTTI = HTDTTI - HTDTTI - HTDTTI
122.      4 + 2*IY (NP1PTR, MP3) + IY (NP1PTR, MP5)
123.      SCOREA (BY, BX) = SCOREA (BY, BX) + TBLA (IP)
124.      SCOREB (BY, BX) = SCOREB (BY, BX) + TBLB (IP)
125.      CX = CX + 1
126.  80  CONTINUE
127.      CY = CY + 1
128.      PTR = PTR + 1
129.  60  CONTINUE
130.      SCSUMB = 0
131.      DO 100 I = 1, NBKY
132.      DO 100 J = 1, NBKX
133.      SCSUMA = SCSUMA + SCOREA (I, J);  SCSUMB = SCSUMB + SCOREB (I, J)
134. 100  CONTINUE
135.      XSUMA = SCSUMA;  XCUMB = SCSUMB
136.      XAVGA = XSUMA/NBKY/NBKX ;  XAVGB = XSUMB/NBKY/NBKX
137.      XSCSQA = 0 ;  XSCSQB = 0
138.      DO 110 I = 1, NBKY
139.      DO 110 J = 1, NBKX
140.      XSCSQA = XSCSQA + SCOREA (I, J)**2;  XSCSQB = XSCSQB + SCOREB (I, J)**2
141. 110  CONTINUE
142.      XTMP1A = XSCSQA/ NBKY/ NBKX ;      XTMP1B = XSCSQB/NBKY/NBKX
143.      XTMP2A = XTMP1A - XAVGA **2 ;      XTMP2B = XTMP1B - XAVGB **2
144.      XDEVA = SQRT (XTMP2A) ;   XDEVB = SQRT (XTMP2B)
145.      WRITE (102, 15) XAVGA, XDEVA, XAVGB, XDEVB
146.  15  FORMAT ('1 XAVGA =', F10.3, ' XDEVA = 1, F10, 5,
147.      21 XAVGB = 1, F10.3, ' XDEVB = 1, F10.5)
148.      DO 90 I = 1, NBKY
149.      WRITE (102, 12) SCOREA (I, J), J = 1, NBKX
150.  12  FORMAT (' 1, 1018)
      90  CONTINUE
```

```
      HTDTTI - HTDTTI - HTDTTI - HTDTTI - HTDTTI
151.        DO 91 I = 1, NBKY
152.        WRITE (102, 12) SCOREB (I, J), J = 1, NBKX
153.   91   CONTINUE
154.        CALL FWRITE (495, ERCD, 0, SCOREA, (LENGTH = 6324), 1, OUTNAME)
155.        CALL FWRITE (495, ERCD, 1000, SCOREB, (LEN = 6324), 1, OUTNAME)
156.        GO TO 220
157.   44   CONTINUE
158.        IWHO = 4HREAD
159.        WRITE (102, 511) IWHO, ERCD
160.        CALL FCLOSE (501$S, ERCD, INNAME)
161.        CALL FCLOSE (501$S, ERCD, OUTNAME)
162.        CALL CLOSES (1, 2)
163.        STOP
164.  501$  CONTINUE
165.        IWHO = 4HC LOS
166.        WRITE (102, 511) IWHO, ERCD
167.  511   FORMAT ('F', A4, 'ERROR, CODE =', Z2)
168.        CALL CLOSES (1, 2)
169.        STOP
170.        CONTINUE
171.        IWHO = 4HWRIT
172.   49   GO TO 59
173.        CONTINUE
174.   43   IF (ERCD . EQ . 7) CALL GETARS; GO TO 53
175.        GO TO 58
176.        CONTINUE
177.   45   IF (ERCD . EQ . 7) CALL GETARS; GO TO 55
178.        GO TO 58
179.        CONTINUE
180.   46   IF (ERCD . EQ . 7) CALL GETARS; GO TO 56
```

FIG. 6F

```
HTDTTI - HTDTTI - HTDTTI - HTDTTI - HTDTTI
181.         IWHO = 4HREAD
182.    58   WRITE (102, 511) IWHO, ERCD
183.    59   GO TO 220
184.   200   OUTPUT (102) 'EOF'
185.   220   CALL FCLOSE (501$S, ERCD, INNAME)
186.         CALL FCLOSE (501$S, ERCD, OUTNAME)
187.         WRITE (102, 201) RECIN
188.   201   FORMAT (' AT RECORD ', I)
189.         CALL CLOSES (1, 2)
190.         STOP
191.         END
```

FIG. 6G

HALFTONE DETECTION AND DELINEATION

A system for determining which areas of an input original in a reprographic system are halftone or text, and more specifically, a system for examining the output bits of a raster input scanner (RIS) for dot patterns likely to be typical of halftone images.

In reprographic systems comprising raster input scanners, it frequently is necessary for the system to be able to detect whether an original is a halftone image or text. Normally, text is easily reproduceable while a halftone must be rescreened, the rescreening process comprising the removal or filtering out of the original screen to produce an internal gray scale image, and the rescreening of that gray scale image to allow reproduction as an output hard copy.

For the purposes of this discussion, line graphics and halftone originals with a screen frequency of less than 85 dots per inch are considered text since they can be reproduced without being screened in the typical reprographic printer.

In the printing art, little thought is usually given to the problem of automatically recognizing halftone originals since the operator will usually start with the highest quality photograph obtainable as the original from which to make copies. The problem is more important in the copier/duplicator field where copies of a mix of halftone images and text are frequently required to be made.

At the most fundamental level, the assumption can be made that all originals are text and processed accordingly. In this case, halftone originals will produce very poor quality copies. Conversely, if the system rescreens everything, the system would operate at about 20% of the original speed and text will be screened, resulting in an inferior copy. Clearly, the better process is to have the raster input scanner and associated circuits automatically determine which areas of the original are text and which are halftone, and process each separately.

One method of detecting halftones is by auto correlation. See, for example, "Automatic Multimode Continuous Halftone Line Copy Reproduction", U.S. Pat. No. 4,194,221. The serial output bit stream from the RIS is divided into two channels, one of which is delayed. Then the two bit streams are compared to uncover any inherent frequencies in the bit pattern. A strong 100 dot per inch frequency, for example, would indicate a halftone area screened at that pitch.

The method described herein is a statistical approach. First, a set of test documents is collected, containing halftones, text, line graphics, forms, and combinations of these. Ideally, the mix is that which will actually be encountered by the system in regular operation. Next, these pages are scanned into memory. Then, particular bit patterns within windows are examined by moving a window line by line and bit by bit across the data to determine which bit patterns correlate, negatively or positively, with a halftone original. On the basis of this statistical analysis, block, window and bit patterns can be established as having the greatest efficiency at detecting halftones.

Generally speaking, the window size should be large enough to span a set of halftone dots but otherwise should be small to minimize the amount of hardware required. In this discussion, eleven evenly spaced bits in a 3×9 bit window will be assumed as the best or preferred embodiment. The exact bit patterns within the window that correlate to halftones are statistically determined.

Since halftone images usually take up less than the full page, this halftone determination must be made on a block by block basis. A larger block generally will lead to a more accurate determination, but will have a greater probability of overlapping a halftone-text boundary. This discussion assumes a 32 by 32 bit block.

After the halftone determination for a band of blocks is made, a second processing step is appropriate to test whether any blocks were inaccurately classified. For example, if an area that is otherwise entirely halftone contains one internal block that was originally determined to be text, the likelihood is great that the area in question is either a very light or dark part of a halftone image. This area, then, would be reclassified as halftone in the second processing step.

The result of the use of this method is that an accurate determination of halftone areas can be made at high speed using a minimum of hardware and/or software.

DETAILED DESCRIPTION OF THE DRAWINGS

Figure 1:
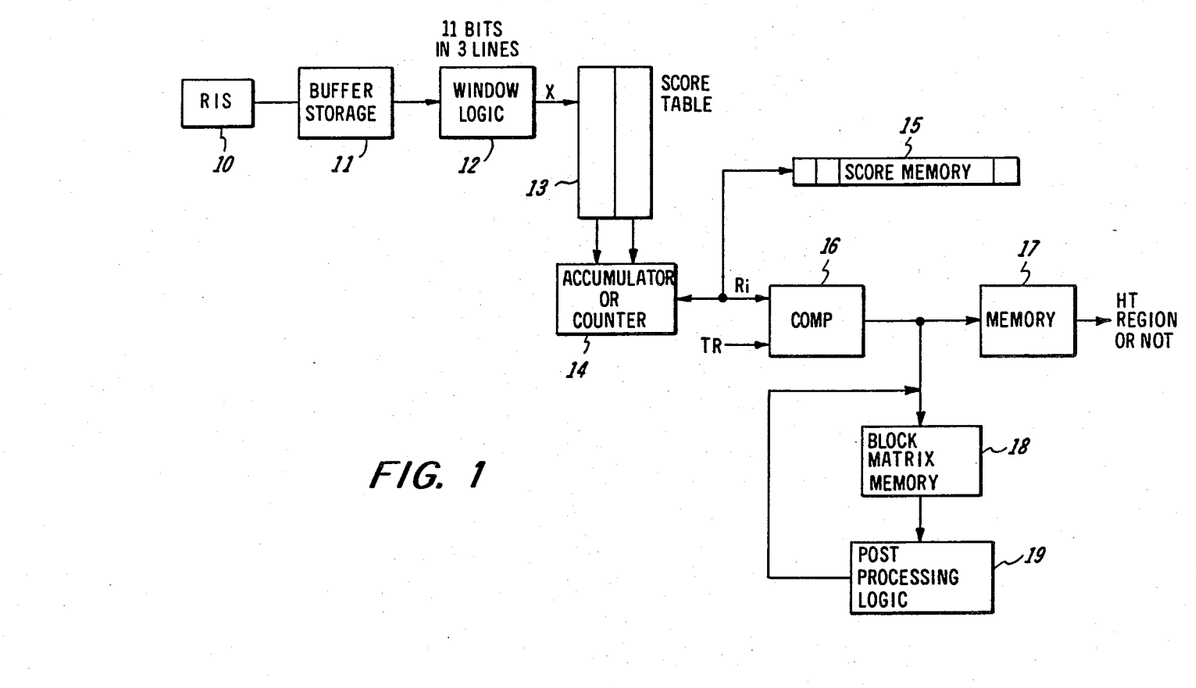
FIG. 1 is a simplified block diagram of a circuit for accomplishing this classification.
Figure 2:
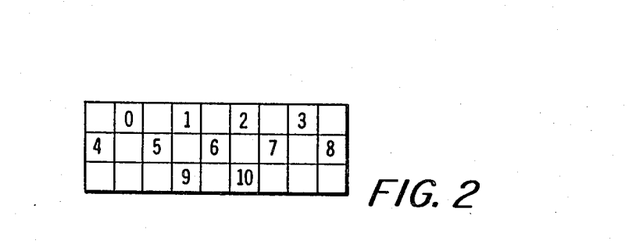
FIG. 2 is the bit pattern and the widow used for this embodiment.

As shown in FIG. 1, a serial bit stream from the output of the raster input scanner 10 is used to determine whether the original is halftone. After the first three rasters have been temporarily stored in buffer storage 11, the bits labeled 0-10 in the 3 by 9 bit window of FIG. 2 are masked from the upper left corner of the page by the window logic 12 of FIG. 1 and are used, directly or indirectly, as the address for the FIG. 1 score table 13.

The score table 13 can be of two forms. In one form, the output of the table look-up is a number of 0 to 9, the larger numbers indicating halftones. In the second form, the score table output can be at +1, −1 or 0, where +1 is a halftone indication, −1 is a text indication, and 0 is reserved for inconclusive bit patterns.

In the first case, the score will be accumulated in an accumulator 14. In the second case, the score table output will drive an up-down counter 14.

After the first score is generated, the window moves one bit position to the right and repeats the process. At the end of the line, the window shifts down one bit position and restarts at the left edge of the page.

In this embodiment, the block size is defined as 32 by 32 bits. Therefore, as the right edge of each block is reached by the window, the accumulated score is stored in the score storage memory 15, and the next block score is transferred to the counter 14 for further accumulation.

After thirty-two complete lines have been processed, each block count is compared to a threshold value in the comparator 16, and an indication, halftone or text, is generated and stored in memory 17.

Whenever three consecutive lines (n−1, n, n+1) have been loaded into storage 17, the n$^{th}$ line can be corrected for undetected halftone blocks. As shown in FIG. 1, the three lines are transferred to the block matrix memory 18, cycled through the post processing logic 19, and restored into memory 18 in corrected form.

Figure 3:
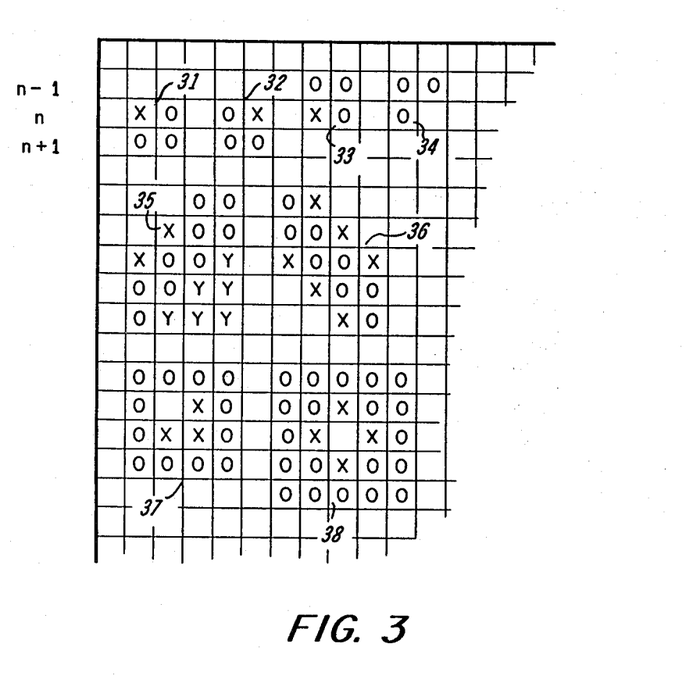
FIG. 3 is a group of block patterns and shows how bits would be reclassified.

The post processing logic can perform in accordance with any patching process, one of which is shown in FIg. 3. In patterns 31, 32 and 33, if three of four bits in a 2×2 pattern are determined to be halftone, the process will correct the pattern to show that the fourth bit is also halftone. On the other hand, as shown in pattern 34, if the fourth bit is in the lower right corner of the 2×2 bit area, it will be considered a text bit. This is necessary to prevent the squaring up of the lower right corner of irregular shapes as shown by the Y bits of pattern 35. This will occur because the correction process moves from left to right, and top to bottom, and each corrected bit is used to determine the next correction.

Patterns 35 and 36 show the operation of this pattern correction technique on diagonal halftone areas. In pattern 36, if the diagonal is upper left to lower right, and the decision making process proceeds from left to right, halftone bits will be added to both upper and lower edges. As shown in pattern 35, halftone bits will be added only to the upper edge. As explained above, if the missing pattern 34 bit is inserted, the lower right corner of diagonals such as pattern 35 will be squared out to a corner, as shown by the Y bits. This would result in large areas being converted from text to halftone and would clearly be undesirable.

Patterns 37 and 38 show how internal areas are corrected. In pattern 37, three of the four bits in the central 2×2 bit square pattern are corrected while in pattern 38, four of the five bits in the internal diamond pattern are corrected.

Figure 4A:
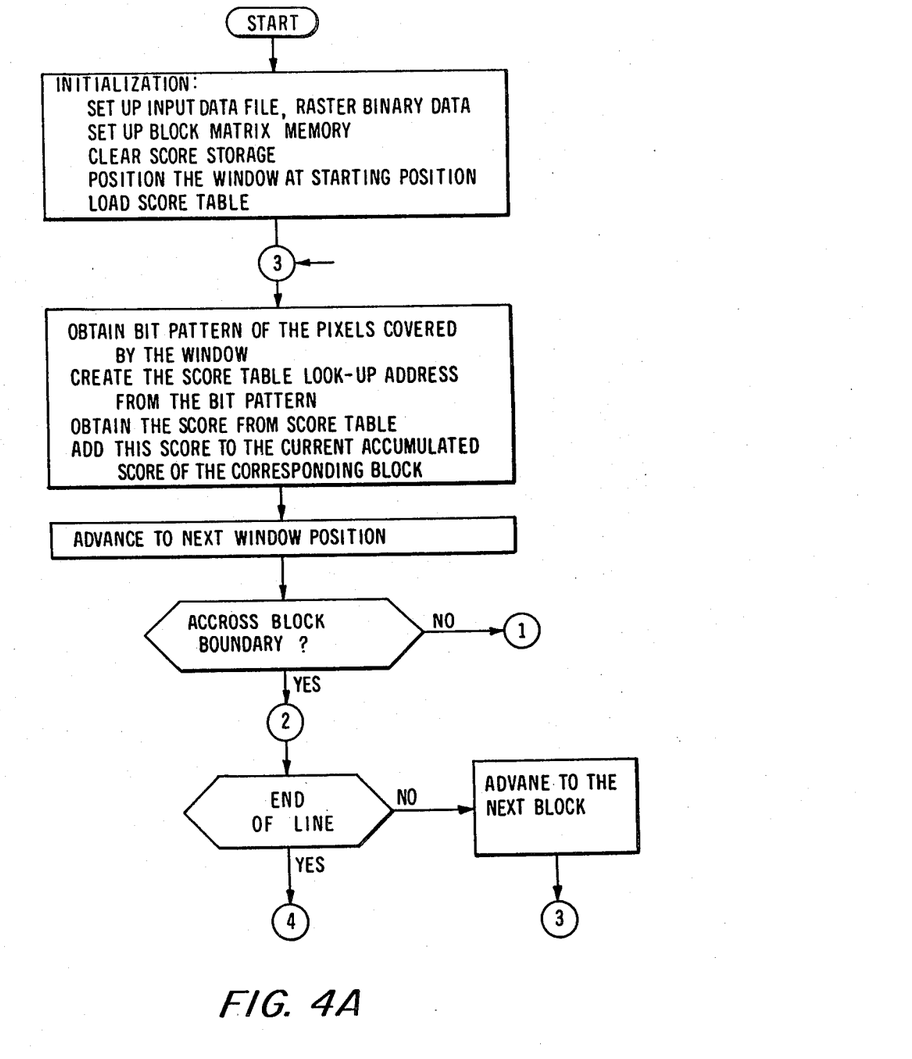
FIGS. 4A and 4B are a detailed flow chart of the program.
Figure 4B:
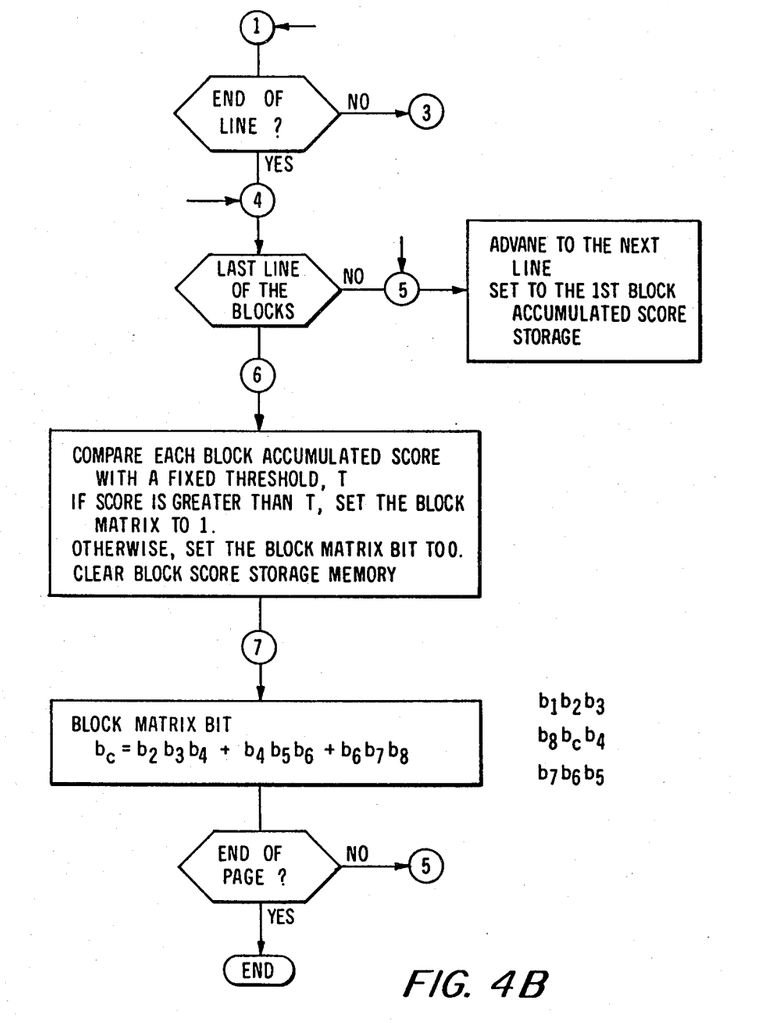

This image data processing may be accomplished in hardware or software. FIGS. 4A and 4B are a detailed flow chart of a program. At the start point in FIG. 4A, there is an initialization. This step clears memory sufficient for an input data file, raster binary data, block matrix memory and score storage memory. The window is positioned at the upper left corner of the page, and if a score table is not predetermined, one can be loaded into the score table memory.

Beginning at point 3 of FIG. 4A, the binary bits designated by the window pattern are extracted and used directly or indirectly to form an address for the look-up table, the output of which is a number from zero to 10. A higher number represents a halftone. This number is accumulated with the previous total.

The window is advanced one bit to the right and tested to determine if it has reached the right edge of a block. If not, the program goes to point 1 of FIG. 4B.

Next, the window is tested to determine if it has reached the end of a line. If not, the program returns to point 3.

When the advancing window reaches the right edge of a block but is not at the end of a line, the program continues from point 2 to start accumulating the next block score.

At the end of a block which is also at the end of a line, the program goes to point 4. If this line is not the last line of a block, the program goes to point 5. Here, the window is advanced to the next line, and the accumulation will resume for the first block.

If the window is at the end of a line which is also the last line of a block, the program goes to point 6. Here, each block count is compared to a predetermined threshold value to determine if that block was halftone or text. The blocks matrix bit is set to 1 or 0, and the block count is zeroed.

At point 7, the post processing is accomplished. The block matrix bit will be changed to a 1 if either (62, 63, 64) or (64, 65, 66) or (66, 67, 68) are all 1s.

After this post processing, if the end of the page has not been reached, the program goes to point 5. At the end of the page, the program ends.

The score table 13 of FIG. 1 is a ROM containing a correspondence of binary image patterns contained in bit 0–10 of the FIG. 2 window to a number which is a function of the probability that the data is from a halftone. The score table loaded in the initialization step of the program in FIG. 4A contains the identical information. In either case, that information is shown in FIGS. 5A and 5B.

The image binary bit patterns is converted to an address (00000001100=12, for example), and the output is as shown.

Figure 5A:
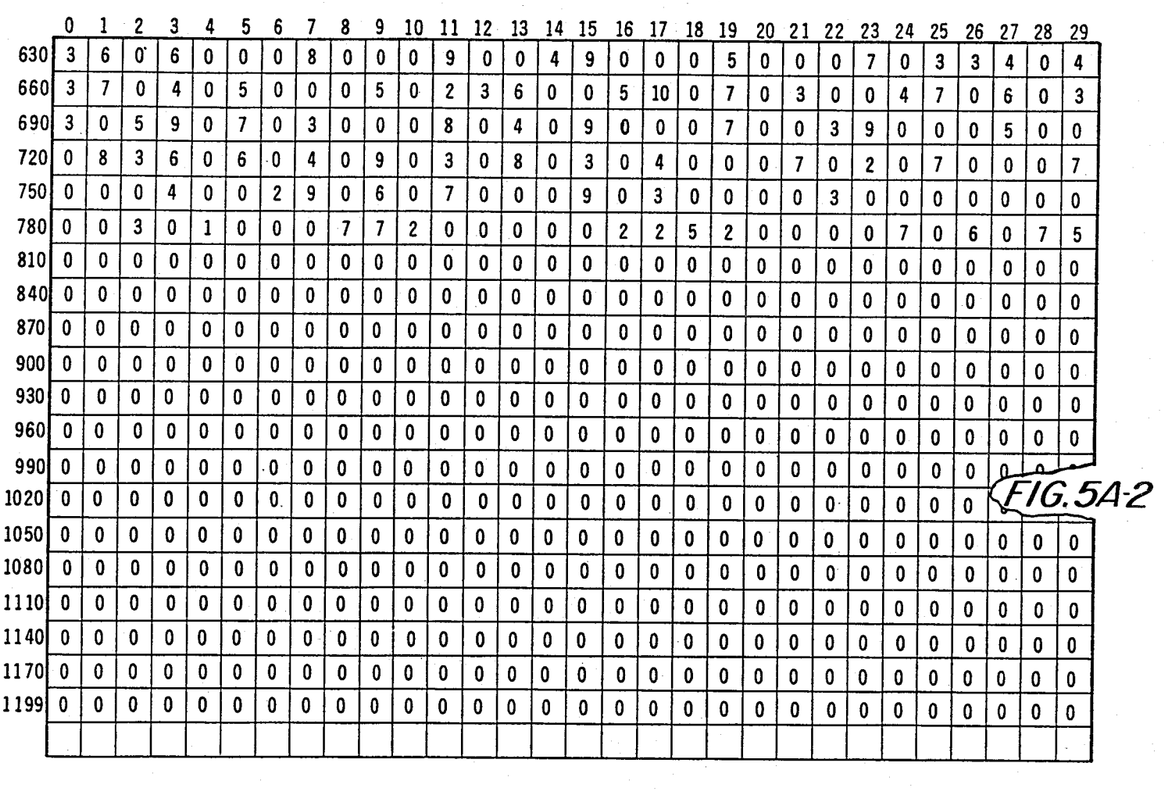
FIGS. 5A and 5B show the contents of the score table memory.
Figure 5B:
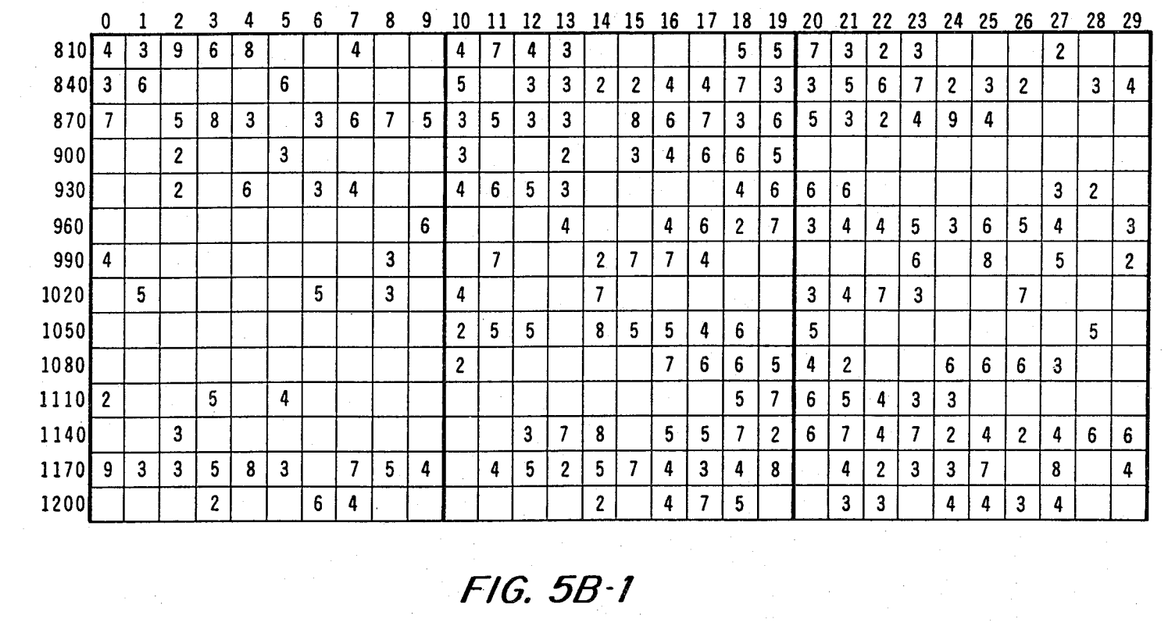
Figure 5B:
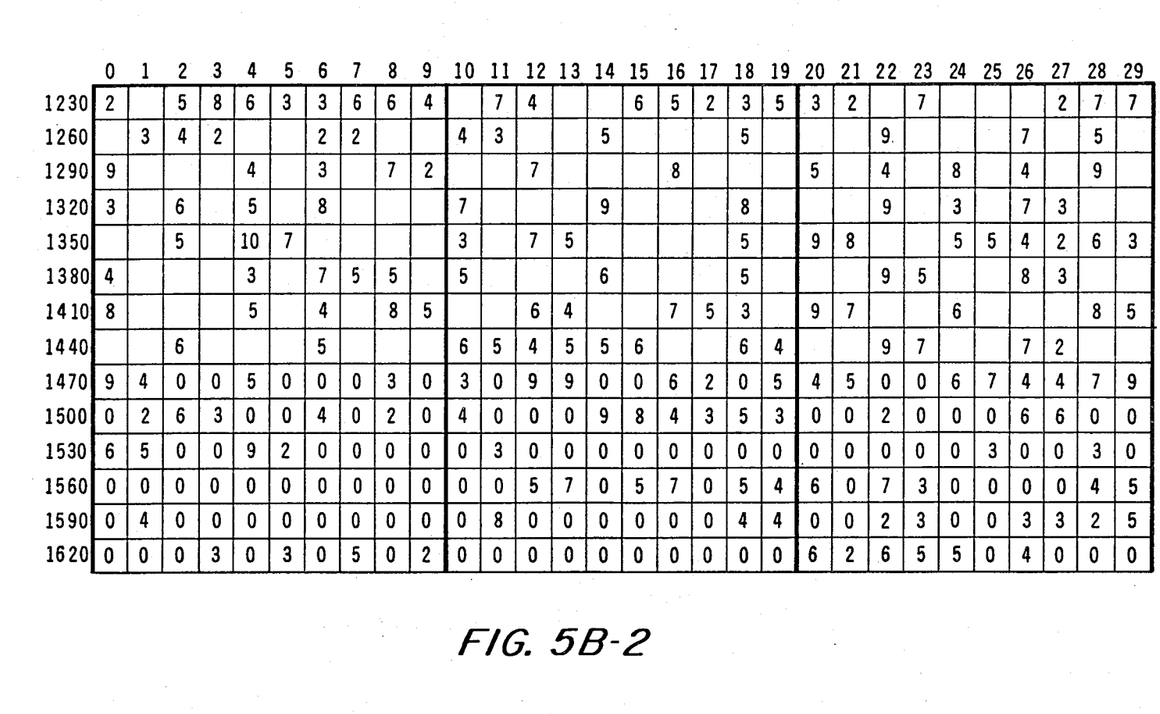
Figure 5B:
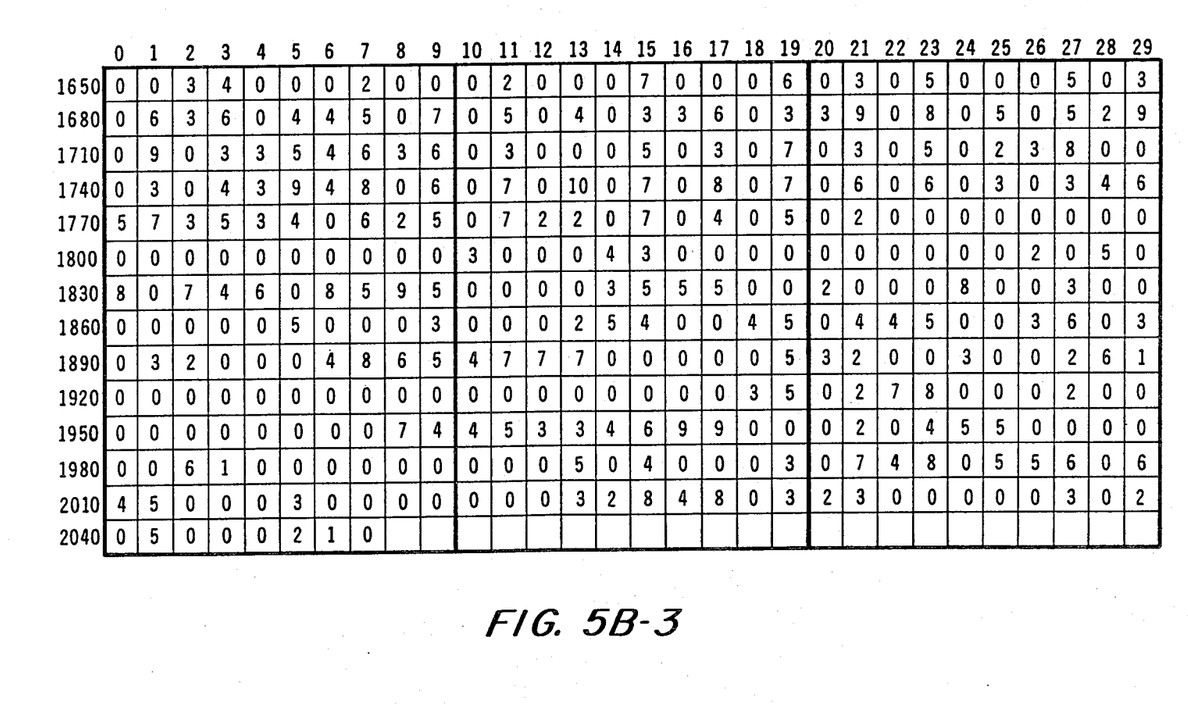
Figure 6A:
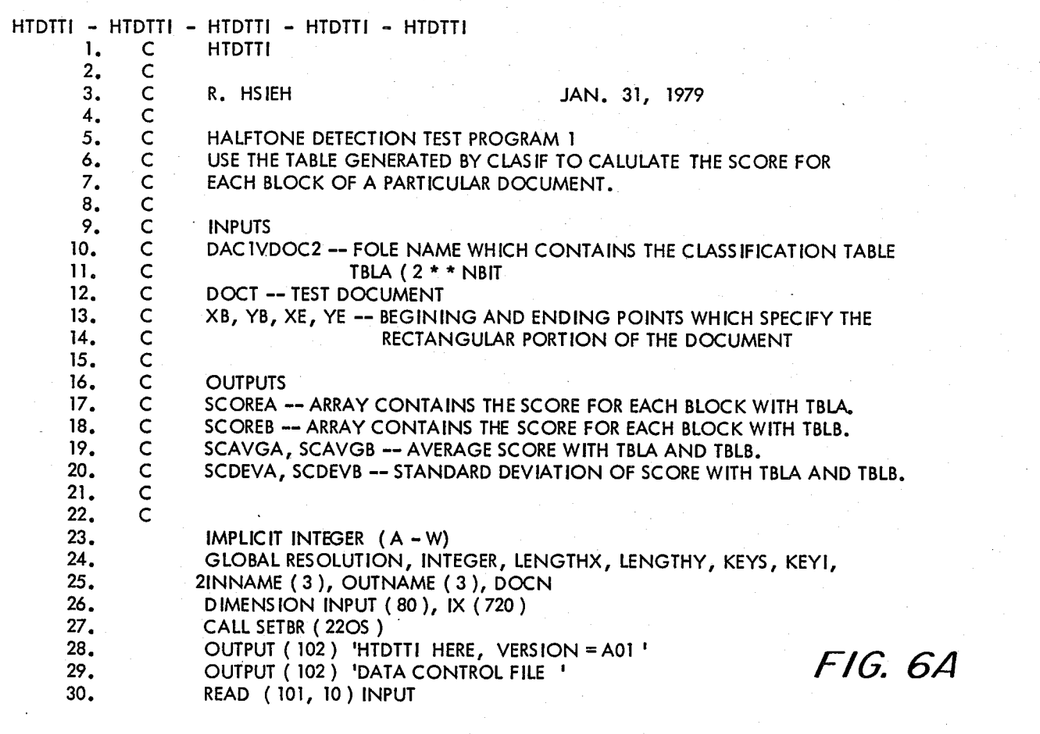
FIGS. 6A–6F combined is a printout of the Fortran program.
Figure 6B:
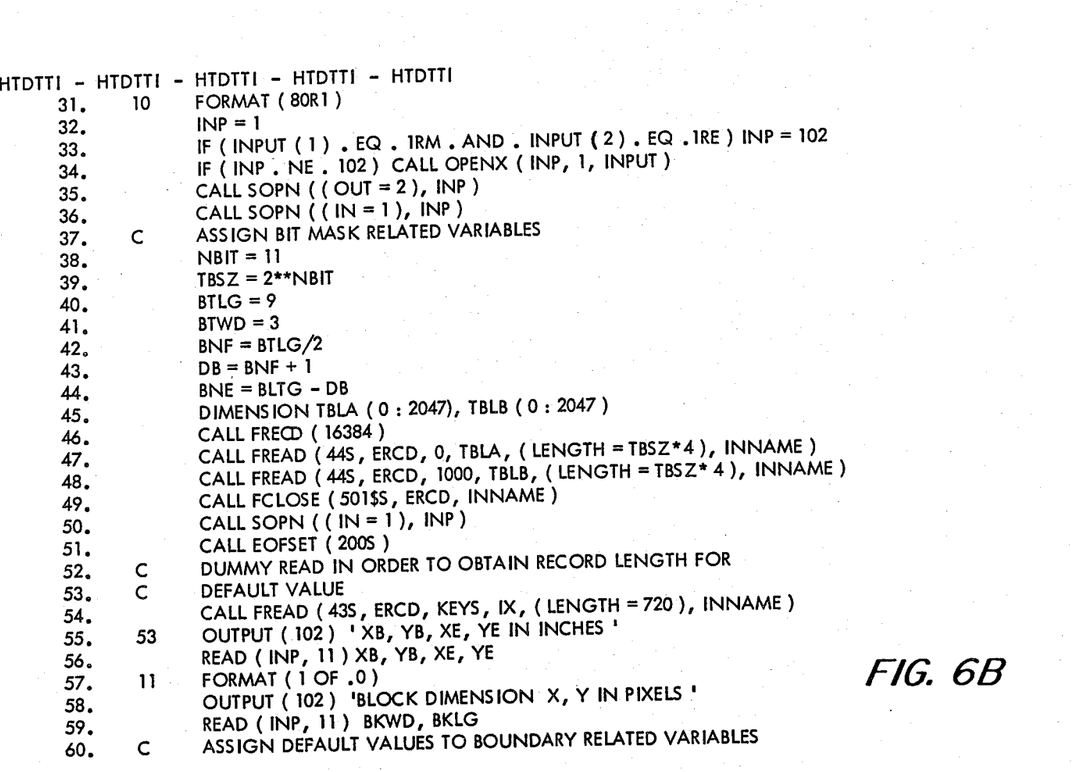
Figure 6C:
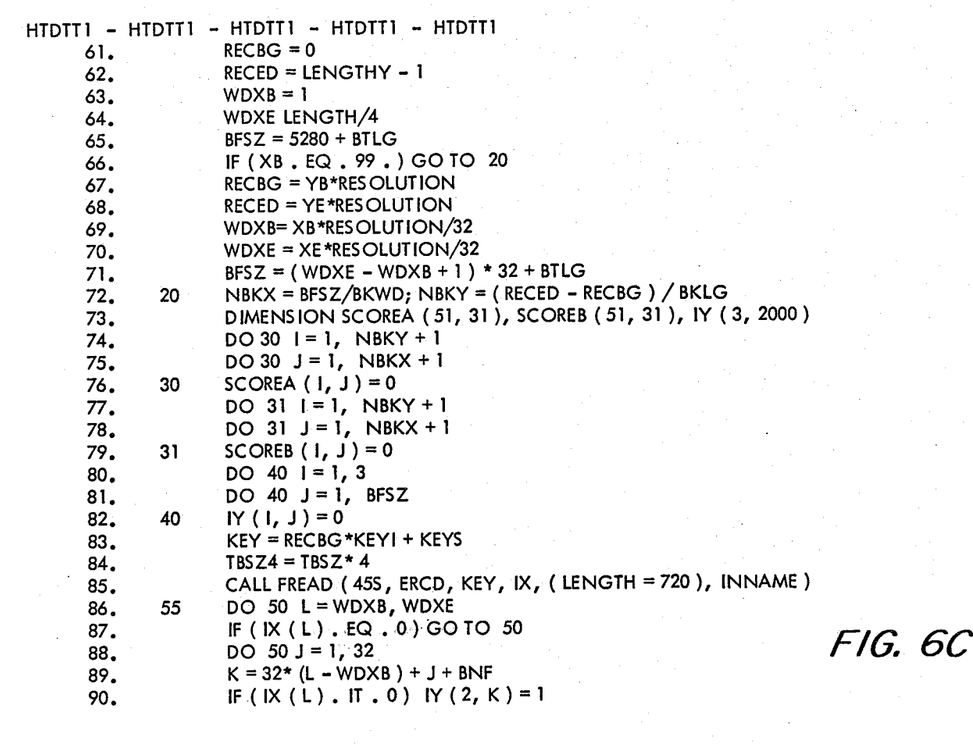
Figure 6D:
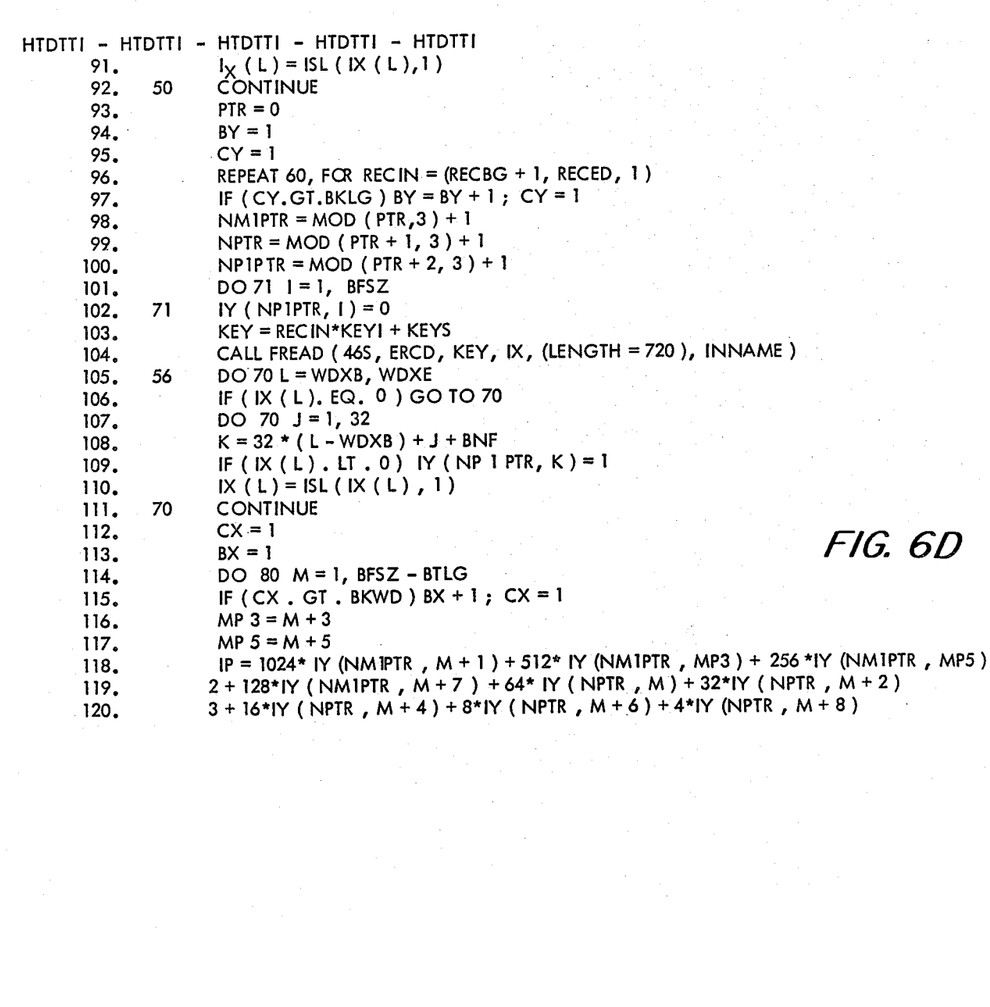
Figure 6E:
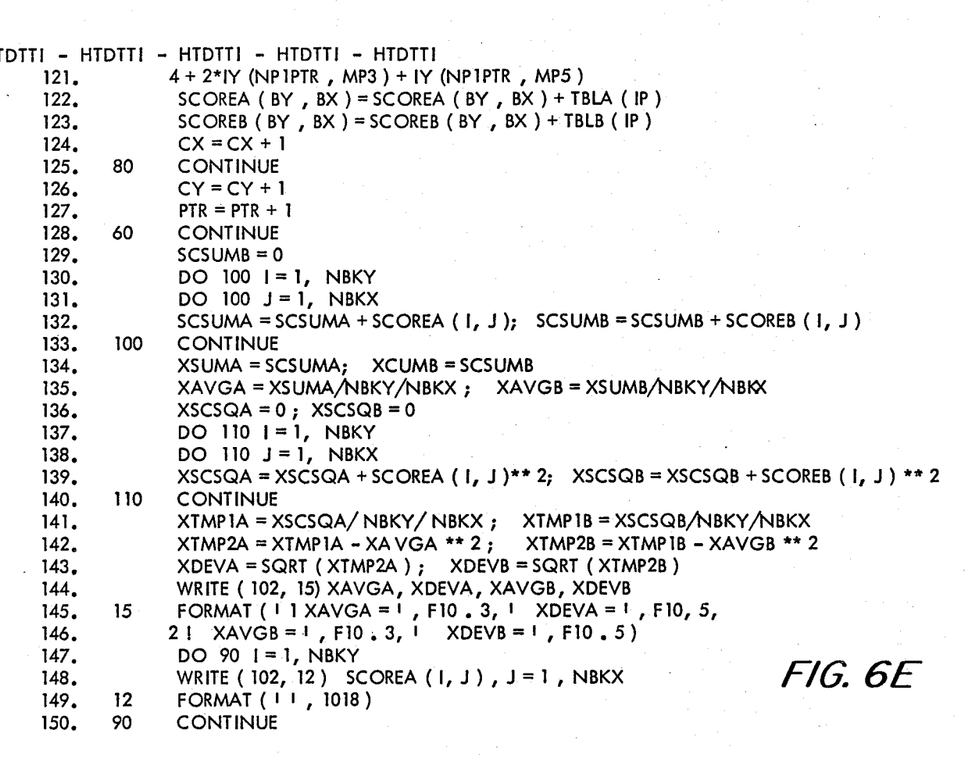
Figure 6F:
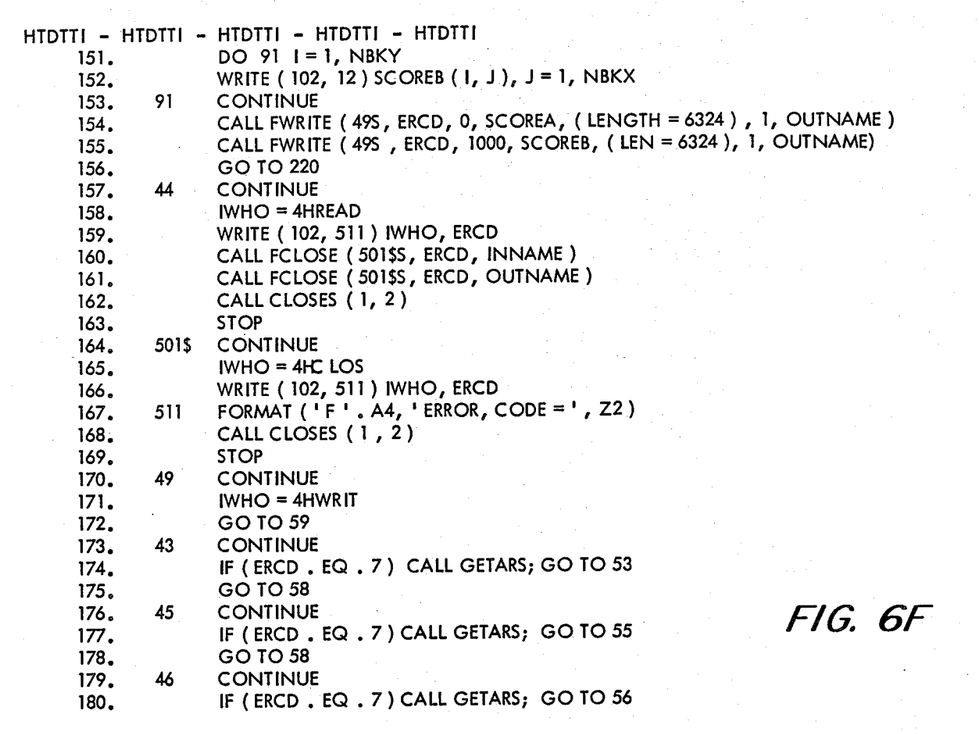
Figure 6G:
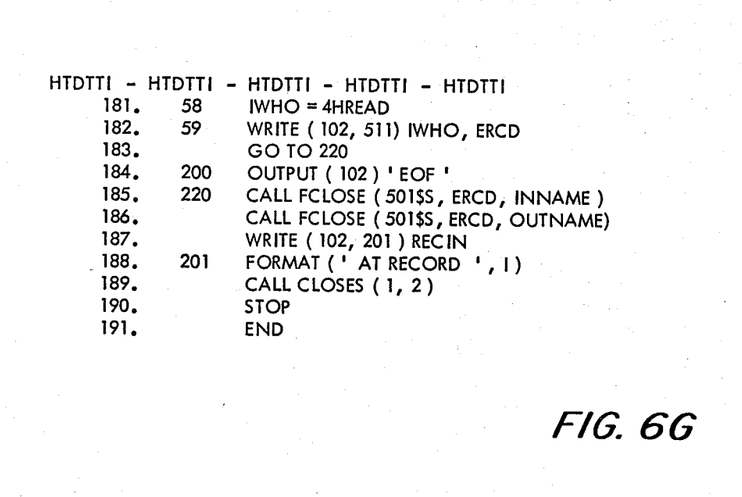

FIGS. 6A through 6F are the Fortran programs corresponding to the flow charts of FIGS. 5A and 5B and, in conjunction with the flow charts, are self-explanatory.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

I claim:

1. A system for determining halftone areas of an original comprising:
    a raster input scanner for scanning said original to generate a stream of binary data bits,
    a buffer storage for storing a plurality of lines of data bits,
    window logic means for selecting a plurality of pattern bits within a predetermined window, a plurality of window locations forming a block,
    a score table memory addressed by a value indicative of a particular pattern in said plurality of pattern bits for outputting a score which is a function of the probability that the scanned portion of the original is a halftone,
    accumulator means for accumulating a running sum of scores for each block,
    comparator means for comparing said sum to a predetermined number to determine if the portion of the original being scanned is a halftone, and
    a pattern storage memory for storing a binary bit indicative of either halftone or text for each comparator means comparison.

2. The system of claim 1 wherein said window is three rows by nine bits, eleven bits are selected from the window, and a block is 32 lines by 32 bits.

3. The system of claim 1 wherein each of said scores is a number from 0 to 10 and wherein said accumulator means adds the scores.

4. The system of claim 1 wherein each of said scores is a number, −1, 0 or +1, and wherein said accumulator means is an up-down counter.

5. The system of claim 1 further comprising:
means for accessing a plurality of bits surrounding each bit stored in said pattern storage memory to correct from text to halftone a text bit partially surrounded by halftone bits.

6. The system of claim 5 wherein said text bit will be corrected to a halftone bit if bits (2, 3 and 4) or (4, 5 and 6) or (6, 7 and 8) are halftone bits, where the surrounding bits are numbered clockwise from the upper left corner.

7. The method of detecting halftone areas of an original comprising the steps of:
raster input scanning an original to produce a series of lines of image data bits,
first storing said image data,
selecting a predetermined number of bits from a window comprising a plurality of rows and columns of said data,
constructing an address from the values of each of said selected bits,
addressing a score table with said constructed address to output a number which is a function of the probability that the window is positioned over a halftone area of said original,
creating a sum of output numbers for each block of image data, said block being formed from a plurality of window locations comprising a plurality of rows and columns of said image data, and
comparing each sum to a predetermined number to determine whether said associated image data block is halftone.

8. The method of claim 7 wherein said window is three lines by nine bits, said predetermined number of bits is eleven, and said block is thirty-two lines by thirty-two bits.

9. The method of claim 7 further comprising the steps of:
generating a one bit indicator bit for each block to indicate whether said associated image data block is halftone or text,
second storing said indicator bits, and
correcting each indicator bit which indicates text to indicate a halftone when said indicator bit is partially surrounded by a plurality of halftone indicating bits in any one of several predetermined patterns.

* * * * *